US012565806B2

(12) United States Patent
Noble

(10) Patent No.: US 12,565,806 B2
(45) **Date of Patent: *Mar. 3, 2026**

(54) EDGE GUARD AND END CAP SYSTEM FOR A FIRE DOOR ASSEMBLY

(71) Applicant: CROWN FIRE DOOR PRODUCTS, INC.

(72) Inventor: Courtney Noble, Sanford, ME (US)

(73) Assignee: CROWN FIRE DOOR PRODUCTS, INC., Sanford, ME (US)

( * ) Notice: Subject to any disclaimer, the term of this patent is extended or adjusted under 35 U.S.C. 154(b) by 203 days.

This patent is subject to a terminal disclaimer.

(21) Appl. No.: 18/383,210

(22) Filed: Oct. 24, 2023

(65) Prior Publication Data

US 2024/0191560 A1 Jun. 13, 2024

Related U.S. Application Data

(63) Continuation-in-part of application No. 18/079,127, filed on Dec. 12, 2022, now Pat. No. 12,286,833.

(51) Int. Cl.
*E06B 5/16* (2006.01)

(52) U.S. Cl.
CPC .................................... *E06B 5/161* (2013.01)

(58) Field of Classification Search
CPC ... E06B 5/16; E06B 5/168; E06B 3/88; E06B 5/161
See application file for complete search history.

(56) References Cited

U.S. PATENT DOCUMENTS

| | | | |
|---|---|---|---|
| 2,133,199 | A | 10/1938 | Kammerer |
| 2,579,861 | A | 12/1951 | Ray et al. |
| 2,717,062 | A | 9/1955 | Dusing et al. |
| 3,130,455 | A | 4/1964 | Borlenghi |
| 3,271,919 | A | 9/1966 | Olton |
| 3,566,541 | A | 3/1971 | Coulter |
| 4,001,974 | A | 1/1977 | Wright |
| 4,281,481 | A | 8/1981 | Wendt |
| 4,748,771 | A | 6/1988 | Lehnert et al. |
| 4,888,918 | A | 12/1989 | Green et al. |
| 5,203,130 | A | 4/1993 | Freelove |

(Continued)

FOREIGN PATENT DOCUMENTS

| | | |
|---|---|---|
| CN | 213869528 U | 8/2021 |
| CN | 219138860 U | 6/2023 |
| EP | 0509701 A1 | 10/1992 |

(Continued)

OTHER PUBLICATIONS

Crown Fire Door Products, Dec. 6, 2020, https://crownfiredoorproducts.com (retrieved via archive.org), p. 1-4.

*Primary Examiner* — Jessie T Fonseca
(74) *Attorney, Agent, or Firm* — Lando & Anastasi, LLP

(57) ABSTRACT

An edge guard system for use with a fire door assembly to installed on a fire door is disclosed. The edge guard system includes a U-shaped channel edge guard that is sized and configured to fit over and to be secured to at least on edge of a fire door. The edge guard includes a first part of a fastener assembly to fasten an end cap to at least one end of the edge guard. The edge guard system also includes at least one end cap sized and configured to fit and be fastened to one end of the edge guard. The end cap includes a second part of the fastener assembly.

11 Claims, 7 Drawing Sheets

(56) References Cited

U.S. PATENT DOCUMENTS

| | | | | |
|---|---|---|---|---|
| 5,214,880 | A | 6/1993 | Woodruff et al. | |
| 5,230,180 | A | 7/1993 | Tweedt et al. | |
| 5,355,625 | A | 10/1994 | Matsuoka | |
| 5,669,192 | A | 9/1997 | Opdyke et al. | |
| 5,836,118 | A | 11/1998 | Thornton et al. | |
| 6,088,966 | A | 7/2000 | Kenkel | |
| 6,170,210 | B1 | 1/2001 | Marts | |
| 6,374,545 | B1 | 4/2002 | Baczuk | |
| 6,478,308 | B1 | 11/2002 | McMillin et al. | |
| 6,668,499 | B2 | 12/2003 | Degelsegger | |
| 6,826,877 | B1 | 12/2004 | Stradel | |
| 7,204,059 | B2 | 4/2007 | Schiffmann et al. | |
| 9,151,106 | B2 | 10/2015 | Noble et al. | |
| 9,518,422 | B2 | 12/2016 | Noble et al. | |
| 2004/0221527 | A1 | 11/2004 | Sykora | |
| 2005/0268559 | A1 | 12/2005 | Ellingson | |
| 2006/0179905 | A1 | 8/2006 | Killins | |
| 2007/0261312 | A1 | 11/2007 | Kuppler | |
| 2009/0241465 | A1 | 10/2009 | Majors | |
| 2011/0095548 | A1 | 4/2011 | Weinraub | |
| 2011/0203251 | A1 | 8/2011 | Mayes et al. | |
| 2011/0283627 | A1 | 11/2011 | Shaw | |
| 2014/0260017 | A1 | 9/2014 | Noble, III | |
| 2015/0354267 | A1 | 12/2015 | Noble, III | |
| 2020/0040647 | A1 | 2/2020 | Cazarez et al. | |
| 2020/0253378 | A1* | 8/2020 | Mølgaard | F16B 12/22 |
| 2020/0370363 | A1 | 11/2020 | Skold, Jr. et al. | |

FOREIGN PATENT DOCUMENTS

| | | | |
|---|---|---|---|
| JP | H094125 | A | 1/1997 |
| KR | 101963296 | B1 | 3/2019 |

* cited by examiner

EDGE GUARD AND END CAP SYSTEM FOR A FIRE DOOR ASSEMBLY

FIELD OF THE INVENTION

The invention relates to edge guard and end cap system for installation on fire doors. More particularly, the invention relates to U-channel and end cap system that protects edges of fire doors from burning due to fire.

DISCUSSION OF THE PRIOR ART

The National Fire Protection Association (NFPA) develops codes and standards that minimize the risk and effects of fire and other hazardous situations. NFPA 80 regulates the installation and maintenance of assemblies and devices used to protect openings in walls, floors, and ceilings. This standard is herein incorporated in its entirety by reference. NFPA 80 specifies the allowable clearances or gaps between fire door and frame and the floor.

Precise standards regulating fire doors exist to ensure that a fire door assembly, which includes a fire door and a fire door frame functions as desired to stop the flow of fire, hot gases, and smoke in a fire. The standards require that the fire door assembly, i.e., the fire door withstand fire for a certain period of time in a fire condition to keep the fire door in place and together, when a fire hose water stream is put onto the fire door, and to hold back the fire, hot gases, and smoke, and also to allow for shrinkage in wood doors, as the wood edges burn away in a fire condition.

Unfortunately, the doors and door frames can be built to the minimum standards and, if the installation isn't perfect, the clearance between the edge of the labeled fire door and the labeled door frame may be excessive, such that the overlap is less than specified or that a gap exists between the edge of the door and the edge of the frame. There are an estimated 150 million fire doors installed in the US today and 80% of them fail a first-time inspection.

What is needed, therefore, is a simple, reliable means of eliminating a gap between a labeled fire door and labeled fire door frame and for the fire door to sustain fire, heat, smoke, and water for a required period of time.

BRIEF SUMMARY OF THE INVENTION

Aspects and embodiments relate to edge guard and end cap system that is part of an overall fire door stop system for use on steel or wood fire door assemblies.

Aspects and embodiments are directed to a U-shaped channel edge guard and end cap that can be attached to at least one end of the U-shaped channel. The U-shaped channel and end cap also referred to herein as a "an edge guard system," is installed on edges of fire doors as part of fire door assemblies. The system helps to protect the at least one edge of the fire door from burning and may also be used to correct excessive clearances for certain edges of fire door assemblies to bring the fire door system into compliance with the fire safety codes.

Aspect and embodiments include an edge guard system for use with a fire door assembly to be installed on a fire door. The edge guard system includes a U-shaped channel edge guard that is sized and configured to fit over and to be secured to at least one edge of a fire door. The edge guard includes a first part of a fastener assembly to fasten an end cap to at least one end of the edge guard. The edge guard system also includes at least one end cap sized and configured to fit and be fastened to at least one end of the edge guard. The end cap includes a second part of the fastener assembly.

According to aspects and embodiments, the first part of the fastener assembly and the second part of the fastener assembly are configured so that the end cap can be attached and secured to one end of the edge guard when the edge guard is installed on the fire door.

According to aspects and embodiments, the edge guard includes a U-shaped channel.

According to aspects and embodiments, the first part of the fastener assembly includes at least one hole in each vertical side of the U-channel.

According to aspects and embodiments, the at least one hole includes a slotted hole having a length that is at least twice the diameter of the first part of the fastener assembly. According to aspects and embodiments, the at least one hole includes a portion that is sized to be greater than a diameter of the first part of the fastener assembly. According to aspects and embodiments, the at least one hole includes an additional portion that is substantially the same diameter of the first part of the fastener assembly.

According to aspects and embodiments, the first part of the fastener includes at least two holes attached to each vertical side of the U-channel. According to aspects and embodiments, the end cap is a substantially U-shaped end cap, and the second part of the fastener includes at least one PEM fasteners on each vertical side of the U-shaped end cap that is placed and arranged to mate with at least two holes in each vertical side of the U-channel.

According to aspects and embodiments, the end cap is a beveled end cap.

According to aspects and embodiments, the edge guard is constructed of 16-to-20-gauge steel. According to aspects and embodiments, the end cap is constructed of 16-to-20-gauge steel.

According to aspects and embodiments, the edge protector has a front face, a rear face, and a horizontal edge, wherein the horizontal edge protector is a three-sided U-shaped channel shape that fits over the horizontal edge face and extends a distance onto the front face and the rear face of the fire door, so as to be installed on and protect the horizontal edge face at one or both of the top and/or the bottom of the fire door.

According to aspects and embodiments, the horizontal edge protector is configured to be fastenable to a bottom edge of the fire door and to be adjustable in its placement on the bottom edge of the fire door so as to reduce a gap between the bottom edge of the fire door and a finished floor surface.

According to aspects and embodiments, the horizontal edge protector is configured to be fastenable to a top edge of the fire door.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION

Figure 1:
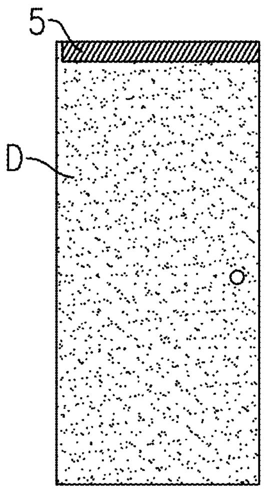
FIG. 1 illustrates the front face of a door with a top edge protector attached.

Aspect and embodiments will now be described more fully in detail with reference to the accompanying drawings, in which the preferred embodiments of the invention are shown. This disclosure should not, however, be construed as limited to the embodiments set forth herein; rather, they are provided so that this disclosure will be complete and will fully convey the scope to those skilled in the art.

Aspects and embodiments relate to edge guard and end cap system that is used as part of an overall fire door stop system for use on steel or wood fire door assemblies. Aspects and embodiments are directed to a U-Channel door edge guard and beveled end cap that can be attached to at least one end of the U-channel. The U-channel and beveled end cap system also referred to as a "system," herein is typically installed on top and/or bottom edges of fire doors of fire door assemblies. The system helps to protect the at least one horizontal edge of the fire door from burning and may also be used to correct excessive clearances for certain edges of fire door assemblies to bring the fire door system into compliance with the fire safety codes.

Reference is made to U.S. Pat. Nos. 9,151,106 and 8,518,422, which are incorporated by reference herein. U.S. Pat. Nos. 9,151,106 and 8,518,422 disclose a fire door stop system 10 that is used with a fire door assembly, to ensure that the assembly remains compliant with fire safety codes. A fire door assembly that is compliant includes a labeled fire door D and a fire door frame. U.S. Pat. Nos. 9,151,106 and 8,518,422 disclose a partial section of a fire door assembly, i.e., a conventional labeled fire door D and a conventional labeled fire door frame 1 with a soffit 2. As illustrated in the figure, there can a gap between the door D and the soffit 2. The fire door stop system 10 of U.S. Pat. Nos. 9,151,106 and 8,518,422 disclose includes a profile strip 3 and an intumescent sealer 4 that is mountable on the profile strip 2, to provide a seal between the fire door D and the profile strip 3. The profile strip 3 has a flange 3A that extends the soffit height of the soffit 2 out from the door frame 1, thereby providing a greater "overlap" area of the edge of the door against the soffit 2.

The fire door stop system 10 of U.S. Pat. Nos. 9,151,106 and 8,518,422 is applied to areas of excessive clearance that frequently occur between the fire door D and the door frame 1, such as between the vertical edge of the fire door D that closes against the door frame 2. The fire door stop system 10 of U.S. Pat. Nos. 9,151,106 and 8,518,422 also includes edge protection, as needed, between the top of the fire door D and the fire door frame 2 and between the bottom of the fire door D and the finished floor.

For example, wood fire doors need added edge protection, because the wood edges, if not protected, may burn out within minutes in a fire condition, leaving little interface between the fire door and the fire door frame. For this reason, the fire door stop system 10 of U.S. Pat. Nos. 9,151,106 and 8,518,422 includes a horizontal edge protector 5, a vertical edge protector 9, and a bottom-edge extender 7.

Wood fire doors have wood edges that burn within minutes in a fire condition, in some cases, leaving no edge to interface with the door frame. These edges require added fire protection along the horizontal edge and/or the vertical edge of the door when clearances are excessive. The edge protector and end cap system including a U-channel and beveled end cap according to aspects and embodiments provides additional structure for protecting these edges.

Figure 2:
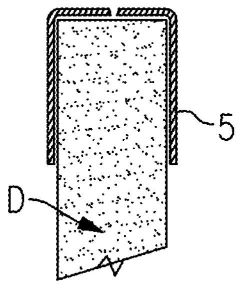
FIG. 2 is a cross-sectional view of the top portion of a door, showing the top edge protector placed over the top edge of the door.

FIGS. 1-2 show a horizontal edge protector 5 that can be used as part of a fire door stop system. FIG. 1 is a front view of the fire door D with a horizontal edge protector secured to the top of the door D and FIG. 2 illustrates a partial side view of the horizontal edge protector. This protector is made of [what is the material] and may be cut to fit, for example, the top horizontal edge of the door D. The horizontal edge protector 5 is a U-shaped profile that is sized and configured to fit around the top edge of the door D. A fastener (not illustrated) can be used to secure the edge protector 5 on the door.

Figure 3:
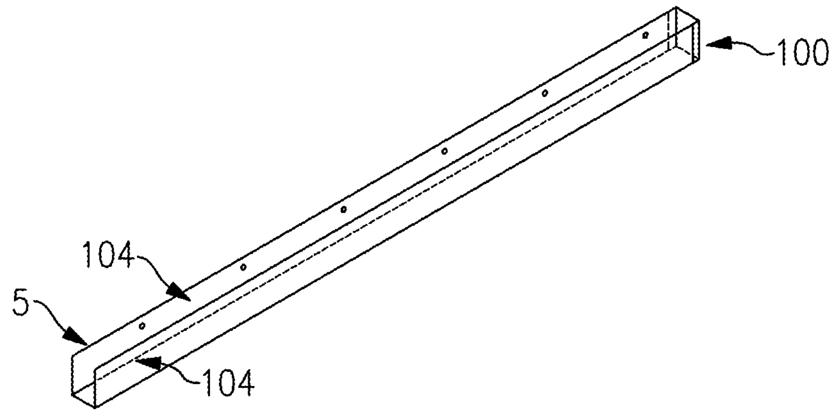
FIG. 3 is a perspective view of an edge protector and end cap system.
Figure 4:
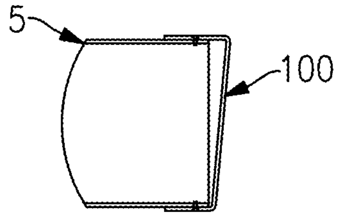
FIG. 4 is an exploded view of an edge protector and end cap system illustrating the end cap attached to one end of the edge protector.
Figure 5:
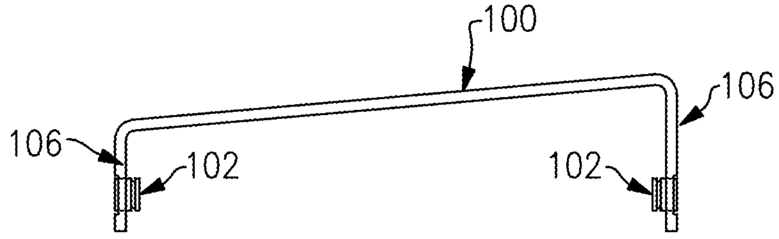
FIG. 5 is a side view of an end cap including PEM fasteners.

FIGS. 3-5 show an embodiment of a horizontal edge protector 5 with an embodiment of beveled end cap 100 according to aspects and embodiments of this disclosure. FIG. 3 is a perspective view and FIG. 4 is a bottom view of the horizontal edge protector 5. FIG. 5 is an exploded view of an embodiment of the endcap 100. The horizontal edge protector is illustrated with including an end cap 100 that is typically secured to at least one end of edge protector. One issue with providing an edge protector 5 with an end cap permanently secured, for example, by spot welding the end cap to one end of the edge protector is that upon ordering the edge protector has to be specified by a customer as either a left-handed door or a right-handed door so that the beveled end cap can be permanently affixed to appropriate end (left end for left-handed door and right end for right-handed door) of the edge protector. This complicates the ordering process for the customer and can cause unnecessary returns and delays should the customer make an error in specifying the type of door. In addition, this requires that both left-handed and right-handed edge protectors with a both a left-handed and right-handed beveled end cap be manufactured and kept in stock. Accordingly, aspects and embodiments of the disclosure are directed to providing a horizontal edge protector 5 and securable beveled end cap 100 that can be supplied to the user without the need for user to specify whether the door is a right-handed door or a left-handed door. Aspects and embodiments of the disclosure are directed to providing a horizontal edge protector 5 and beveled end cap 100 that that can be used with either a right-handed door or a left-handed door.

FIG. 5 is an exploded view of an embodiment of an endcap 100. In an embodiment, the end cap 100 is a U-shaped, end cap with a horizontal surface that is beveled. The end cap is configured with at least 2 fasteners 102 on each of two vertical sides 106 of the beveled end cap 100.

In one embodiment, the end cap 100 has a width substantially the width of the edge protector 5 so that the end cap fit 100 fits snugly onto the end of the edge protector 5. The edge protector 5 is a U-shaped channel that is configured with corresponding mating holes 108 (See FIGS. 6-7) in vertical sides 104 of the U-shaped channel that are configured and positioned to mate with the fasteners 102. In one embodiment, the holes 108 have a diameter of about approximately a diameter of a largest diameter portion of the fastener 102 so as to enable each fastener to be inserted into the mating hole 108 and into secure engagement. In such embodiment the resiliency properties of the U-channel edge protector 5 can be take advantage of to squeeze the vertical sides 104 of the edge protector, align the fasteners 102 with corresponding holes 108 in the end cap 100 and release (stop squeezing) the vertical sides 104 of the edge protector to securely engage the end cap 100 to the edge protector 5.

Figure 6:
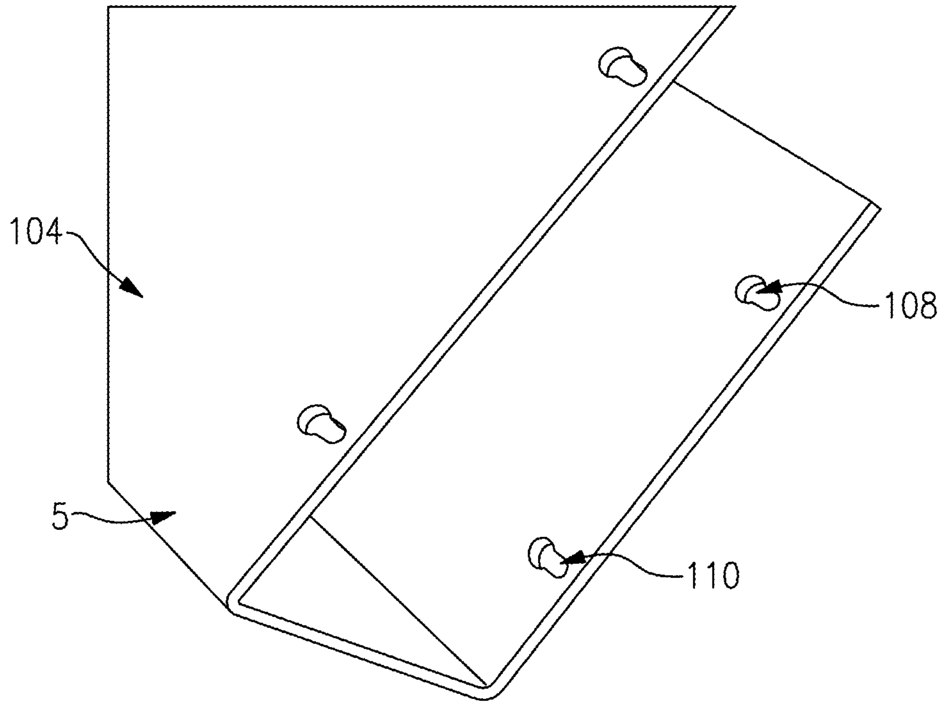
FIG. 6 illustrates vertical sides of the U-shaped edge guard with hole portions of the fastener system.
Figure 7:
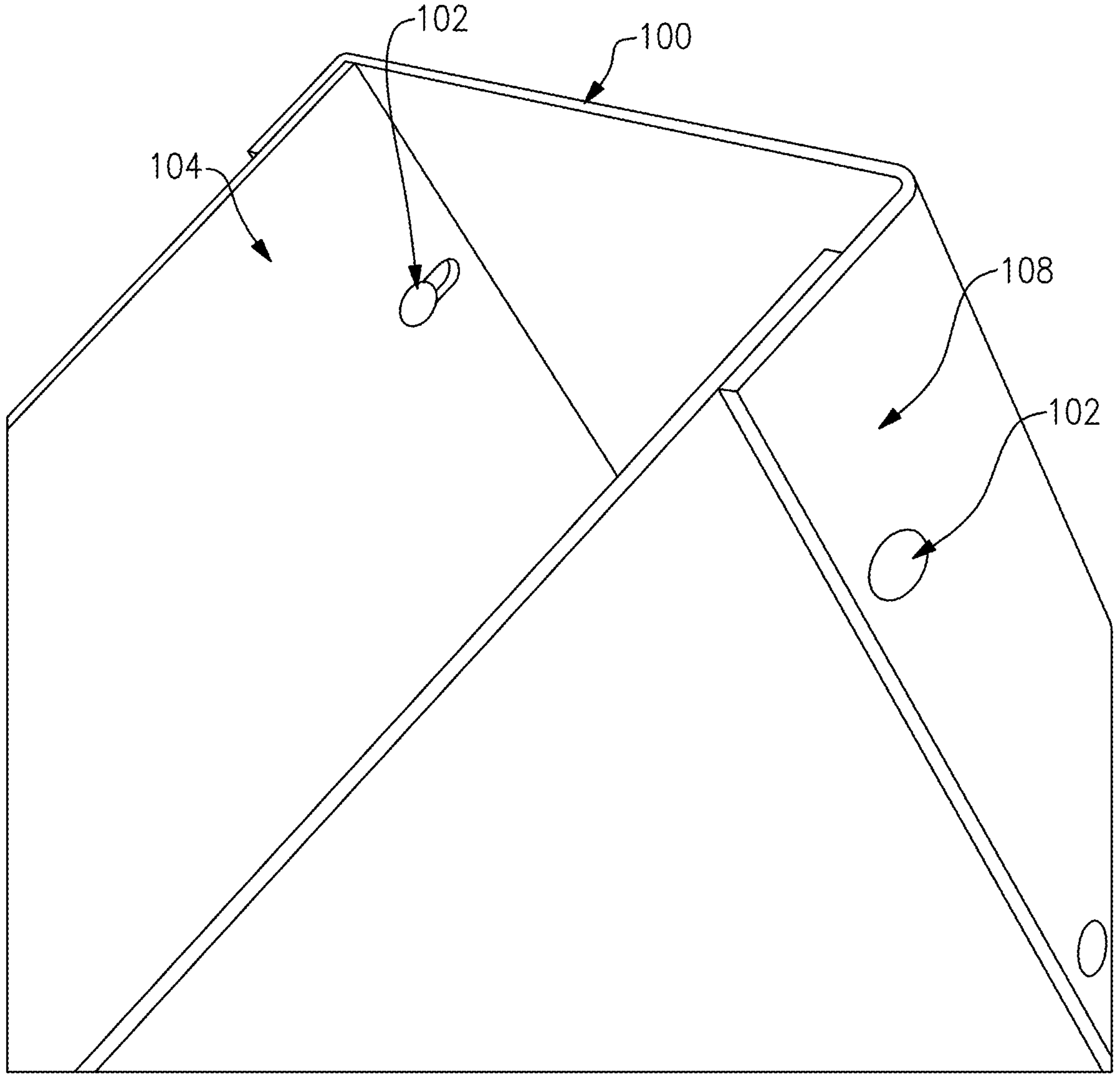
FIG. 7 illustrates the fasteners securing the end cap to the edge protector.

Referring to FIG. 6, in another embodiment the holes (108/110) are oblong and have a length of at least approximately twice a diameter of the fastener 102 with a portion of the hole 108 having a diameter larger than the a largest diameter of the fastener 102 so as to enable each fastener to be inserted into the hole portion 108 with the larger diameter and then slid along the hole and into secure engagement with a remaining portion 110 of the slotted hole having a diameter substantially the diameter of the fastener.

In a preferred embodiment, the fasteners are PEM fasteners. The fasteners can be Part #SF-3-1.2-ZI, Type SF SpotFast® Fasteners produced by Manufacturer Penn Engineering® (PEM®). In one embodiment, as configured, a user can slightly squeeze the parallel sides 104 of the U-channel edge protector 5 and align the beveled end cap PEM fasteners 102 with the corresponding holes 108 in the U-channel edge protector 5 and then stop squeezing the sides of the U-channel edge protector 5 so as to insert the PEM fasteners into place with the corresponding holes. In such embodiment, the end cap 100 is held in place by the outward pressure applied by the vertical sides 104 of the edge protector. In another embodiment, after PEM fasteners 102 are aligned with the corresponding holes 108, the end cap can be moved so that the fasteners are moved along and in engagement with the slot 110 so as to securely attach the beveled end cap 100 to at least one end of the U-channel edge protector 5. With either arrangement, the U-channel edge protector and end cap can then be installed, for example, on a horizontal top edge and/or the horizontal bottom edge of the fire door D. The width of the U-channel edge protector 5 and the end cap 100 is such that the edge protector and the end cap can be snugly fit over and the horizontal edge of the fire door D. It is further appreciated that the edge protector 5 and end cap 100 combination can further be secured to the fire door D, for example by way of additional screws inserted through the horizontal face of the edge protector or one or both vertical sides 104 of the edge protector.

Typically, SF™ fasteners create a permanent, flush joining of two sheets. The SF fastener is designed for joining metal to metal. They install smooth with the top sheet, and flush or sub-flush with the bottom sheet. Fasteners can attach two metal sheets too difficult to weld; fasten sheets of unequal thicknesses; join dissimilar metals unable to be welded; and even attach ultra-thin metal sections. Typically an installation procedure for joining two sheets of metal with would include preparing a properly sized mounting hole in both panels, placing a second panel with a smaller mounting hole than the first panel on an anvil and aligning a first panel mounting hole with the mounting hole of the second panel, placing the smaller diameter end of the fastener through the mounting holes and with a punch and the anvil surfaces parallel, applying a squeezing force until the fastener is flush with the top of Panel and any gap between the panels is eliminated. Squeezing the fastener into place causes a cold flow of panel material into the fastener's two separate clinch profiles.

It is appreciated that according to aspects and embodiments of the disclosure, the SF SpotFast® Fasteners are used in a different way than typically used to create a permanent connection between two sheets. In particular, the SF SpotFast® Fasteners are used as noted above to create a secure, but non-permanent, connection of U-shaped end cap to the U-shaped edge protector. In particular, the end cap including two PEM fasteners 102 on each vertical side of the U-shaped end cap is aligned with the corresponding holes in the vertical sides of the U-channel edge protector 5, so as to insert the PEM fasteners into place with the corresponding holes 108 to secure the end cap 100 to at least one end of the U-channel edge protector 5. In another embodiment, the fasteners 102 are further slid along the slot 110 so as to securely attach the end cap 102 to the at least one end of the U-channel edge protector 5.

It is also appreciated that in an alternate embodiment, the fastener 102 can also be inserted and installed (attached) to the blind side (inside) of the U-channel edge protector with the SF™ fastener portion being on the vertical portions of the U-shaped channel and the corresponding holes (108, 110) formed in the vertical sides of the U-shaped end cap 100.

According to aspects and embodiments of this disclosure, SF™ fasteners can be used to create a non-permanent, flush joining of a U-shaped end cap to a U-shaped door edge guard. Some of the advantages of using SF™ fasteners as disclose herein are that:

- The fastener can be flush or sub-flush on both sides of the end cap and inside the U-channel edge protector.
- Minimal space requirements are needed.
- No countersinking or other special hole treatment is needed other than creating the hole of certain diameter and length (in the slotted embodiment).
- No special installation equipment is required.
- The fasteners can be concealed with paints and powder coatings.

Unlike rivets that "bulb" during installation, the ultimately flush profile of SpotFast® fasteners allows for unobtrusive attachment requiring minimal space. A smooth surface can be retained for finishing and fasteners can be concealed easily with paints or powder coatings.

Figure 12A:
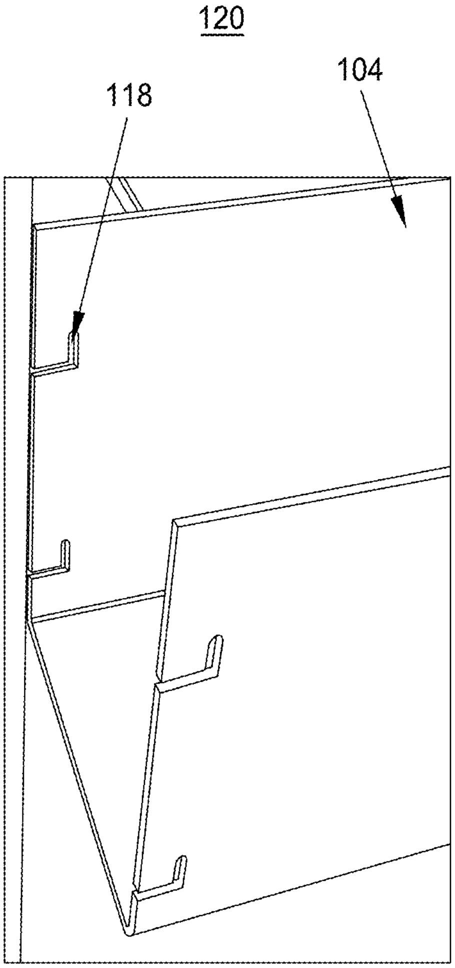
FIGS. 12A and 12B illustrate another embodiment of an endcap and U-channel.
Figure 12B:
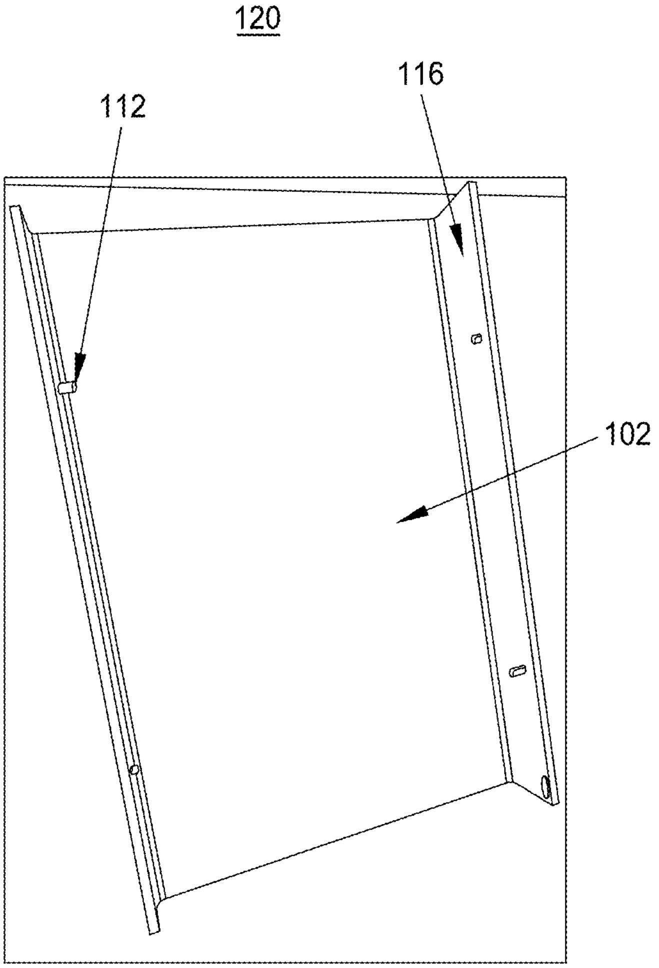

FIGS. 12A and 12B illustrate another embodiment of an endcap 120 and U-channel. The end cap 120 is a U-shaped. The end cap is configured with at least 2 fasteners 112 on each of two vertical sides 116 of the beveled end cap 100. In one embodiment, the end cap 120 has a width substantially the width of the U-shaped channel so that the end cap fit 120 fits snugly onto an end of the the U-shaped channel. The U-shaped channel is configured with L-shaped slots 118 in the vertical sides 104 of the U-shaped channel that are configured and positioned to mate with the fasteners 112 of the end cap. In one embodiment, the L-shaped slots 118 have a diameter of about approximately a diameter of the fasteners 112 so as to enable each fastener to be inserted into L-shaped slots 118 and then slid horizontally along the slot and vertically into secure engagement. In such embodiment the resiliency properties of the U-channel edge can be take advantage of to squeeze the vertical sides 104 of the edge protector, align the fasteners 112 with corresponding L-shaped slots 118 and release (stop squeezing) the vertical sides 104 of the U-shaped channel to securely engage the end cap 120 to the U-shaped channel.

Figure 8:
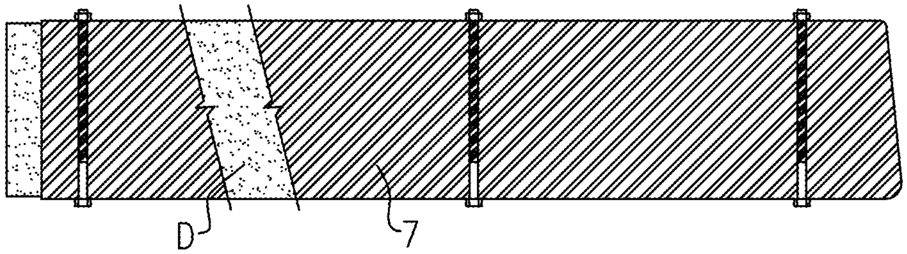
FIG. 8 is a plan view of the bottom edge of a door, with a bottom extension attached to the door that can include the edge protector and end cap system.
Figure 9:
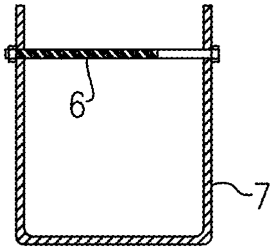
FIG. 9 illustrates details of an embodiment the bottom extension.
Figure 10:
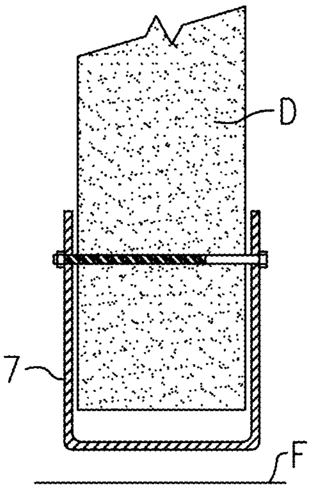
FIG. 10 shows an embodiment of the bottom extension fastened to the bottom edge of a door.
Figure 11:
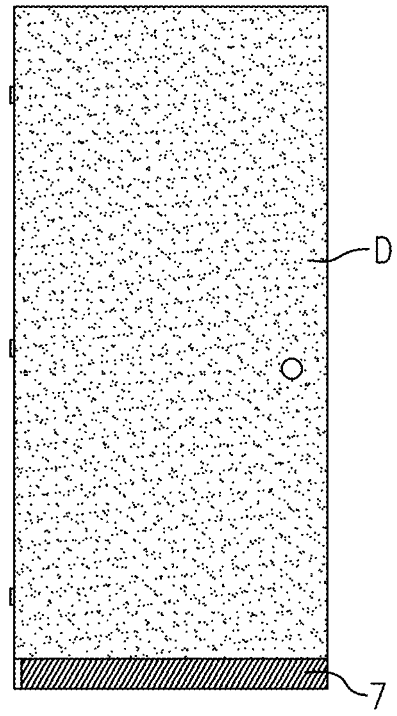
FIG. 11 is a plan elevation view of the front face of a door, showing an embodiment of the bottom extension attached to the bottom edge of the door.

FIGS. 8-11 illustrate a bottom-edge extender 7. FIG. 8 is a plan view of the bottom of a fire door, with the bottom extension 7 attached. FIG. 9 illustrates cross section view of an embodiment the bottom-edge protector. FIG. 10 particularly shows how the bottom extension 7 is used to reduce the gap between the bottom edge of the door D and the floor F. FIG. 11 is a plan elevation view of the front face of a door, showing an embodiment of the bottom extension attached to the bottom edge of the door. According to aspects and embodiments, the bottom-edge extender 7 includes the edge protector 5 and end cap 100 system as disclosed herein. As illustrated, in one embodiment, the bottom-edge extender 7 including the edge protector 5 and end cap 100 can be attached to the bottom horizontal edge of the door by placing over the edge of the door and can be further held in an appropriate position to set the gap between the bottom of the edge-protector and the floor with a nut 6 and bolt arrangement. It is also appreciated that bottom extension 7 can be secured to the fire door D in the desired position by way of additional screws inserted through the one or both vertical sides of the bottom extension 7.

According to the fire safety code, the bottom edge of a fire door has to be with a certain distance of the floor, i.e., within ¾ inch or closer to the finished floor. Often, the gap between the bottom edge of the door and the floor is greater than the distance specified by the safety code. According to aspects of the disclosure, the bottom-edge extender 7 including the edge protector and end cap system is attached to the bottom edge of a finished fire door and attached to the door so that a lower edge of the bottom-edge extender is provides a proper distance from the finished floor, thereby bringing the labeled fire door into compliance with the code. The extender 7 included the horizontal edge protector 5 with, for example, the beveled end cap 100 according to aspects and embodiments of this disclosure. The U-Channel is sized so that doors with a clearance of up to two inches may be extended downward to meet the code minimum distance requirement and be brought into compliance with the fire safety code.

The U-channel and beveled end cap system can be made of 16-guage to 20-gauge steel that is applied to the one or more edges of the door. The U-channel and beveled end cap system protects the edge of the fire door and can provide an overlap of the door with that frame ensures that the fire door is capable of withstanding any of the fire hose stream pressure, fire, smoke, and heat requirements.

The U-channel and beveled end cap system according to aspects and embodiments provides edge protection as part of an overall fire door stop system that provides enhanced performance of the fire door, which is an integral part of a life-safety protection system. The fire door stop system including the U-channel and beveled end cap system accommodates the typical business practice of manufacturing to minimum standards and imperfections in manufacturing and installation.

It is appreciated that the beveled end cap can be secured to the edge protector at both ends. It is also appreciated that the edge protector and beveled end cap be used on at least one vertical edge of the fire door D. It is further appreciated that a first part of the fastener can be provided in either the vertical sides of end cap or the U-shaped channel and the second part of the fastener, in particular the PEM fastener, can be installed in the other of the vertical sides of the U-shaped channel or the vertical sides of the end cap. A door stop system including an edge protector 5 and beveled end cap 100 according to aspects and embodiments is constructed to match the rating of the fire door assembly.

It is understood that the embodiments described herein are merely illustrative of the present invention. Variations in the construction of the fire door stop system may be contemplated by one skilled in the art without limiting the intended scope of the invention herein disclosed.

What is claimed is:

1. An edge guard system to be installed on a fire door, the edge guard system comprising:

a U-shaped channel that is sized and configured to securely fit over at least one edge of the fire door, the U-shaped channel including a first part of a fastener assembly to fasten at least one end cap to at least one end of the U-shaped channel, the first part of the fastener assembly including the at least one L-shaped slot in each vertical opposing side of the U-shaped channel that is sized to be substantially the same as or greater than a largest diameter of a second part of the fastener assembly; and the at least one end cap sized to have a dimension that extends from a bottom of the U-shaped channel to a top of the U-shaped channel and configured to fit and be fastened to the at least one end of the U-shaped channel, the at least one end cap including the second part of the fastener assembly;

wherein the first part of the fastener assembly and the second part of the fastener assembly are configured so that the at least one end cap can be securely attached to the at least one end of the U-shaped channel.

2. The edge guard system of claim 1, wherein the at least one end cap is a substantially U-shaped end cap, and the second part of the fastener assembly includes at least two unthreaded, round, metal fasteners on each vertical side of the U-shaped end cap that are placed and arranged to mate with the at least two L-shaped slots in each vertical side of the U-shaped channel.

3. The edge guard system of claim 1, wherein the at least one end cap is a substantially U-shaped end cap, and the second part of the fastener includes at least one unthreaded, round, metal fastener on each vertical side of the U-shaped end cap that is placed and arranged to mate with the at least one L-shaped slot in each vertical side of the U-shaped channel.

4. The edge guard system of claim 3, wherein the at least one end cap is a beveled end cap.

5. The edge guard system of claim 1, wherein the U-shaped channel is constructed of 16-to-20-gauge steel.

6. The edge guard system of claim 1, wherein the at least one end cap is constructed of 16-to-20-gauge steel.

7. The edge guard system of claim 1, wherein the at least one end cap is sized so as to fit tightly over the at least one end of the U-shaped channel, and wherein the U-shaped channel is configured so that vertical walls of the U-shaped channel can be squeezed so that the at least one end cap can be place over the at least one end of the U-shaped channel and the second part of the fastener assembly can be aligned with the first part of the fastener assembly so that when the vertical walls of the U-shaped channel are released such that the at least one end cap is securely held in place.

8. The edge guard system of claim 7, wherein the fire door has a front face, a rear face, and the at least one edge comprises a horizontal edge, wherein the U-shaped channel and the at least one end cap are sized so as to fit tightly over the horizontal edge of the fire door and extend a distance onto the front face and the rear face of the fire door, so that when the edge guard system is installed on the horizontal edge of the fire door the U-shaped channel cannot be squeezed and the at least one end cap is maintained in place.

9. The edge guard system of claim 7, wherein the at least one edge comprises a horizontal edge and the U-shaped channel is placed on a horizontal edge of the fire door and the edge guard system is configured so that its placement on the horizontal edge of the fire door can be adjusted so as be able to modify a position of the edge guard system so as to vary a height of the edge guard system so as to reduce a gap between the horizontal edge of the fire door and a finished floor surface.

10. The edge guard system of claim 7, wherein the edge guard system is configured to be fastenable to a top edge of the fire door with a plurality of fasteners.

11. The edge guard system of claim 2, wherein the at least one end cap is a beveled end cap.

* * * * *